United States Patent
Kadaba et al.

(10) Patent No.: US 6,298,305 B1
(45) Date of Patent: Oct. 2, 2001

(54) METHODS AND APPARATUS FOR PROVIDING VOICE GUIDANCE IN A VEHICLE NAVIGATION SYSTEM

(75) Inventors: Sudha G. Kadaba, Santa Clara; Laura White, San Jose, both of CA (US)

(73) Assignee: Visteon Technologies, LLC, Dearborn, MI (US)

( * ) Notice: Subject to any disclaimer, the term of this patent is extended or adjusted under 35 U.S.C. 154(b) by 0 days.

(21) Appl. No.: 09/116,161

(22) Filed: Jul. 15, 1998

(51) Int. Cl.⁷ .................................................. G06F 165/00
(52) U.S. Cl. ...................... 701/211; 701/200; 701/208; 701/209; 73/178 R
(58) Field of Search .................................. 701/200, 207, 701/209, 210, 211, 214, 23, 208; 342/357.13; 73/178 R; 704/246

(56) References Cited

U.S. PATENT DOCUMENTS

| | | |
|---|---|---|
| 3,845,289 | 10/1974 | French . |
| 4,570,227 | 2/1986 | Tachi et al. . |
| 4,608,656 | 8/1986 | Tanaka et al. . |
| 4,611,293 | 9/1986 | Hatch et al. . |
| 4,672,565 | 6/1987 | Kuno et al. . |
| 4,673,878 | 6/1987 | Tsushima et al. . |
| 4,723,218 | 2/1988 | Hasebe et al. . |
| 4,734,863 | 3/1988 | Honey et al. . |
| 4,751,512 | 6/1988 | Longaker . |
| 4,782,447 | 11/1988 | Ueno et al. . |
| 4,796,191 | 1/1989 | Honey et al. . |
| 4,797,841 | 1/1989 | Hatch . |
| 4,831,563 | 5/1989 | Ando et al. . |
| 4,862,398 | 8/1989 | Shimizu et al. . |
| 4,914,605 | 4/1990 | Loughmiller, Jr. et al. . |
| 4,918,609 | 4/1990 | Yamawaki . |

(List continued on next page.)

FOREIGN PATENT DOCUMENTS

| | | |
|---|---|---|
| 0 485 120 A2 | 5/1992 | (EP) . |
| 0 575 943 1 | 12/1993 | (EP) . |
| 0 579 451 A1 | 1/1994 | (EP) . |
| 2 271 423A | 4/1994 | (GB) . |
| 5-332778 | 12/1993 | (JP) . |
| WO 97/31241 | 8/1997 | (WO) . |

OTHER PUBLICATIONS

French, MAP matching Origins Approaches and Applications, Rober L. French & Associates, 3815 Lisbon St., Suite 201, Fort Worth, Texas 76107, USA, pp. 91–116.

*Primary Examiner*—William A. Cuchlinski, Jr.
*Assistant Examiner*—Gertrude Arthur
(74) *Attorney, Agent, or Firm*—Beyer Weaver & Thomas, LLP

(57) ABSTRACT

Methods and apparatus are described for providing route guidance to a user of a vehicle navigation system. In response to selection of a destination by the user, a route is generated from a first position to the destination. The route includes a plurality of maneuvers. A plurality of maneuver instructions are generated corresponding to the plurality of maneuvers. An audio representation of each of the maneuver instructions is presented prior to execution of a corresponding one of the maneuvers. In response to a first signal generated when the vehicle is at a first location on the route, all remaining maneuver instructions corresponding to maneuvers on the route after the first location are sequentially presented. According to another embodiment, a most recently presented maneuver instruction is presented in response to the first signal. According to yet another embodiment, the audio level associated with at least one instruction is adjusted in response to the first signal. According to still another embodiment, the audio representation of selected maneuver instructions includes the associated street name.

17 Claims, 5 Drawing Sheets

U.S. PATENT DOCUMENTS

| | | |
|---|---|---|
| 4,926,336 | 5/1990 | Yamada . |
| 4,937,753 | 6/1990 | Yamada . |
| 4,964,052 | 10/1990 | Ohe . |
| 4,970,652 | 11/1990 | Nagashima . |
| 4,982,332 | 1/1991 | Saito et al. . |
| 4,984,168 | 1/1991 | Neukrichner et al. . |
| 4,989,151 | 1/1991 | Nuimura . |
| 4,992,947 | 2/1991 | Nimura et al. . |
| 4,996,645 | 2/1991 | Schneyderberg Van DerZon . |
| 4,999,783 | 3/1991 | Tenmoku et al. . |
| 5,040,122 | 8/1991 | Neukirchner et al. . |
| 5,046,011 | 9/1991 | Kakihara et al. . |
| 5,060,162 | 10/1991 | Ueyama et al. . |
| 5,177,685 | 1/1993 | Davis et al. . |
| 5,272,638 | 12/1993 | Martin et al. . |
| 5,283,743 | 2/1994 | Odagawa . |
| 5,287,297 | 2/1994 | Ihara et al. . |
| 5,297,050 | 3/1994 | Ichimura et al. . |
| 5,359,529 * | 10/1994 | Snider ................................ 701/210 |
| 5,369,588 | 11/1994 | Hayami et al. . |
| 5,374,933 * | 12/1994 | Kao ................................ 342/357.13 |
| 5,410,485 | 4/1995 | Ichikawa . |
| 5,412,573 | 5/1995 | Barnea et al. . |
| 5,463,554 | 10/1995 | Araki et al. . |
| 5,486,822 | 1/1996 | Tenmoku et al. . |
| 5,506,774 | 4/1996 | Nobe et al. . |
| 5,508,931 * | 4/1996 | Snider ................................ 701/207 |
| 5,513,110 | 4/1996 | Fujita et al. . |
| 5,519,619 | 5/1996 | Seda . |
| 5,521,826 | 5/1996 | Matsumoto . |
| 5,619,708 * | 4/1997 | Ho ................................ 707/506 |

* cited by examiner

METHODS AND APPARATUS FOR PROVIDING VOICE GUIDANCE IN A VEHICLE NAVIGATION SYSTEM

BACKGROUND OF THE INVENTION

The present invention relates to route guidance in the context of a vehicle navigation system. More specifically, methods and apparatus are provided by which audible route guidance instructions are provided to the user of a vehicle navigation system.

The utility of providing voice guidance in vehicle navigation systems is unquestioned in the industry. This is particularly true where voice guidance reduces the necessity that the driver make visual contact with the system's display in situations where it may be hazardous to do so, i.e., when the vehicle is in motion. In fact, as speech synthesis and voice recognition technologies mature it is likely that vehicle navigation systems will become increasingly dependent on such technologies for many system functions including, for example, destination selection, route guidance, and even vehicle security.

Most currently available vehicle navigation systems provide some level of voice guidance to the user. For example, a driver might be alerted to an upcoming maneuver with a warning "Right turn ahead" or "Next exit on the left" when the vehicle is determined to be within some threshold distance to the maneuver. However, given the complexity and uniqueness of each vehicle's circumstances and the wide variety of road topologies, it is currently very difficult to provide voice instructions which describe an upcoming maneuver with even a moderate level of precision. That is, for example, systems do not typically identify the road at which the right turn is to be made or the name of the upcoming exit. This is largely due to the fact that vehicle navigation systems typically employ a library of voice instructions, the size of which is kept relatively small to conserve memory and processing resources. Obviously, recording and storing a number of maneuvers for each street name in a typical map database is not practicable.

It is therefore desirable to develop enhancements to current voice guidance techniques which provide a greater level of detail with regard to upcoming maneuvers without degrading overall system performance. It is also desirable that systems employing voice guidance techniques provide features which will enable the user to most effectively use the system. For example, presenting maneuver instructions only as the vehicle approaches the associated maneuver may not be sufficient to provide a desirable level of comfort for some users. Therefore, providing some means of previewing, reviewing, and/or repeating instructions is desirable. Another problem which needs to be addressed is the often dramatic variation in background noise affecting the user's ability to hear the instructions as they are given. Some means of compensating for this is therefore desirable.

SUMMARY OF THE INVENTION

According to the present invention, methods and apparatus are described herein by which voice guidance is provided to the driver of a vehicle navigation system which reduces the driver's dependency on the system's visual display. A number of voice guidance features are described. In each of the described embodiments, the user specifies a destination and a route is generated from the vehicle's current position to the destination. For each maneuver identified in the route, the system then generates a maneuver instruction to be communicated to the user at an appropriate interval before the vehicle arrives at the maneuver location. According to one embodiment, the user may at any time during navigation request that the system sequentially communicate all previous or remaining instructions. The former could be useful where, for example, the user has deviated from the route and would like to review the previous maneuver instructions. The latter could be useful where, for example, the user would like more advance warning of upcoming maneuvers.

According to another embodiment, the user may at any time during navigation request that the system repeat the most recently presented maneuver. This is obviously useful in the situation where the user did not hear the instruction. Another embodiment is also directed at ensuring that the user is able to hear the instructions when presented. In this embodiment, the audio level for the instructions is adjusted to compensate for background noise in the vehicle environment. According to one embodiment, the audio level is adjusted in accordance with the vehicle speed. This takes into account that ambient noise increases with vehicle speed. According to another embodiment, the ambient noise level is sampled and the audio level adjusted accordingly.

According to yet another specific embodiment, the street name associated with each maneuver is included in the audio representation which is communicated to the user. For each instruction, the system determines the street name and then constructs an audio representation of the street name using voice synthesis techniques. The synthesized audio representation is then incorporated with generic prerecorded instruction components, e.g., "right turn ahead at", to generate an appropriate maneuver instruction. This has the great advantage of identifying the upcoming maneuver with greater particularity therefore further reducing the user's dependence on the visual display. In addition, this embodiment obviates the need to store an audio representation for every street name in the map database, a currently impracticable solution.

Thus, the present invention provides methods and apparatus for providing route guidance to a user of a vehicle navigation system. In response to selection of a destination by the user, a route is generated from a first position to the destination. The route includes a plurality of maneuvers. A plurality of maneuver instructions are generated corresponding to the plurality of maneuvers. An audio representation of each of the maneuver instructions is presented prior to execution of a corresponding one of the maneuvers. In response to a first signal generated when the vehicle is at a first location on the route, all remaining maneuver instructions corresponding to maneuvers on the route after the first location are sequentially presented. According to another embodiment, a most recently presented maneuver instruction is presented in response to the first signal. According to yet another embodiment, the audio level associated with at least one instruction is adjusted in response to the first signal. According to still another embodiment, the audio representation of selected maneuver instructions includes the associated street name.

A further understanding of the nature and advantages of the present invention may be realized by reference to the remaining portions of the specification and the drawings.

DESCRIPTION OF SPECIFIC EMBODIMENTS

Figure 1:
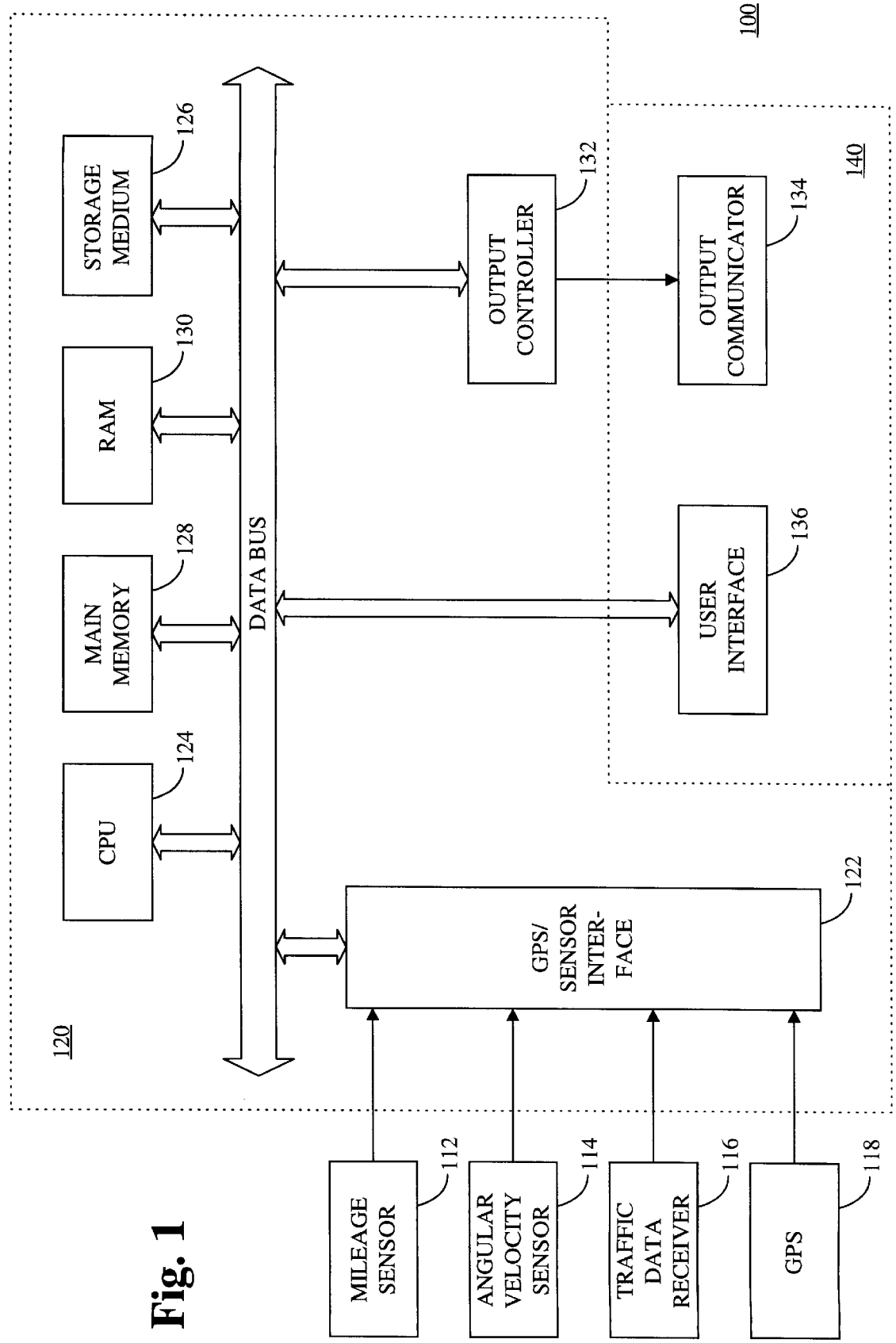
FIG. 1 is a block diagram of a specific embodiment of a vehicle navigation system for use with the present invention.

FIG. 1 is a block diagram of a specific embodiment of a vehicle navigation system 100 for use with the present invention. Sensors 112 and 114, traffic data receiver 116, and GPS receiver 118 are coupled to computing means 120 through sensor/GPS interface 122. In typical embodiments, mileage sensor 112 comprises an odometer, and angular velocity sensor 114 comprises a gyroscope, or a differential odometer coupled to the wheels of the vehicle. Traffic data receiver 116 may comprise any of a wide variety of RF receivers which are operable to receive real time traffic data transmitted in a variety of formats. A global positioning system (GPS) data receiver 118 is provided for receiving signals from, for example, a satellite-based navigation system. Data from sensor/GPS interface 122 is transmitted to CPU 124, which performs calibration, signal processing, deadreckoning, vehicle positioning, and route calculation and guidance functions. A database containing map information may be stored in database medium 126, with software directing the operation of computing means 120 stored in main memory 128 for execution by CPU 124. Various embodiments of the present invention are embodied as such software. Memory 128 may comprise any of a wide variety of non-volatile memory such as, for example, read-only memory (ROM), reprogrammable non-volatile memory such as flash memory or SRAM, CD ROM, optical disk, or PCMCIA cards. System RAM 130 permits reading and writing of the information necessary to execute such software programs. Database medium 126 may comprise non-volatile memory, a hard disk drive, CD-ROM, or an integrated circuit in which digitized map information has been stored. Output controller 132, which may comprise a graphics controller, receives data processed by CPU 124 and transmits the data to display console 140 which includes output communicator 134, usually comprising a display screen with associated audio electronics and speakers. The user may input data, such as a desired destination, through user interface 136, typically comprising a keyboard. Alternatively user interface 136 may comprise a microphone coupled to speech recognition circuitry allowing a user to communicate with the system using voice commands.

The map database stored in database medium 126 preferably comprises positional data such as, for example, latitude and longitude coordinates, to describe road intersections or nodes, road segments, landmarks and points of interest, and other geographical information. The data base may further comprise data representing characteristics of roads or places on the map, such as road and place names, road features such as dividers, one-way restrictions, surface, speed limit, shape, elevation, and other properties. According to specific embodiments of the invention, the map database includes cost values associated with individual nodes and road segments. These cost values correspond to the estimates of time intervals for traversing the respective node or segment. Node cost values take into consideration such information as, for example, whether the vehicle would encounter oncoming traffic, thus delaying a left turn maneuver. Segment costs reflect road segment characteristics such as speed limit and segment length, both of which affect the travel time along the segment. Also associated with each road in the map database is a hierarchy value which relates to the category or type of the road. For example, the highest level category of the hierarchy includes freeways and expressways. The lowest level includes residential streets and/or alleys. The information stored in map database medium 126 is employed with the data received from interface 122 for route calculation and guidance.

Figure 2:
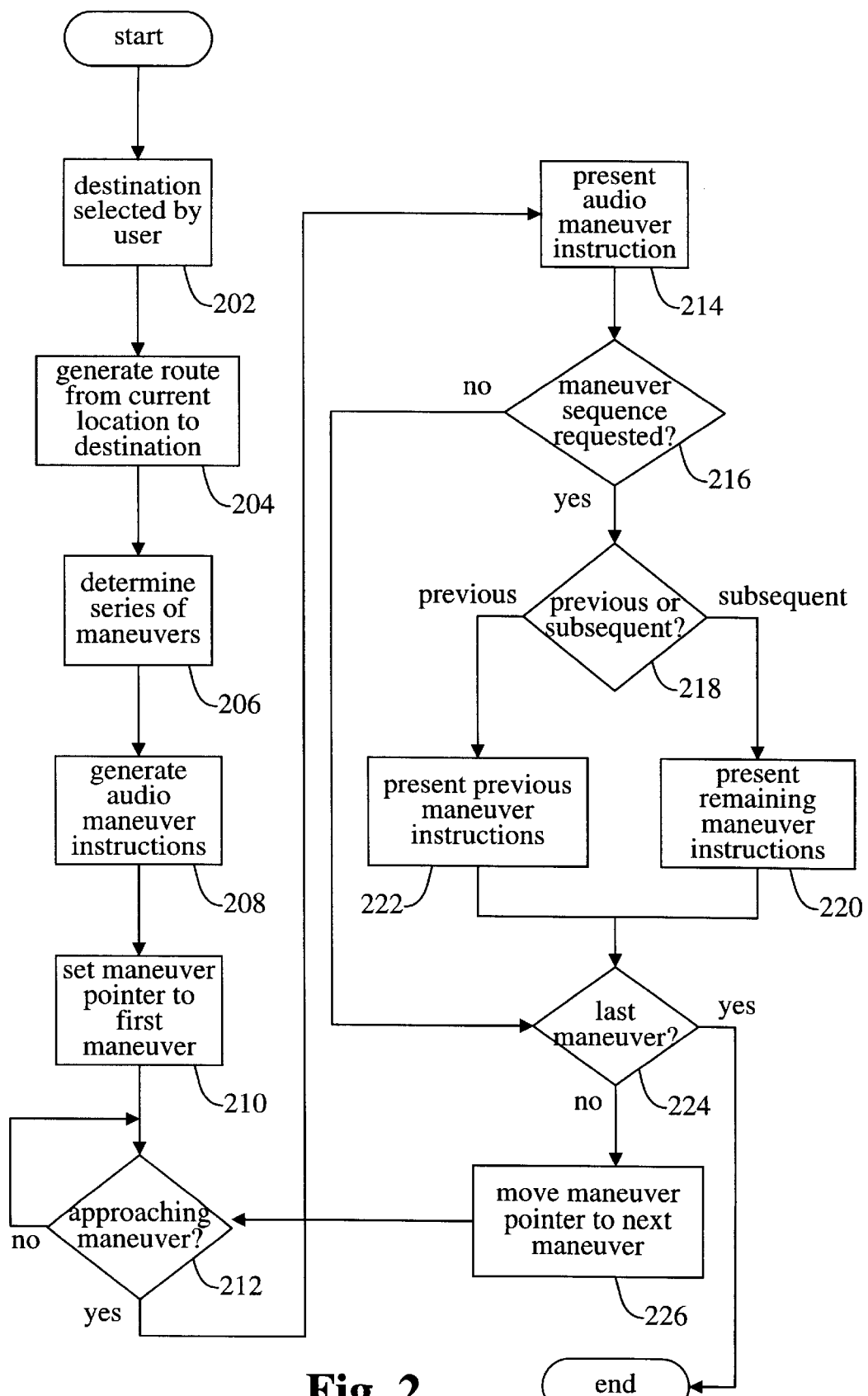
FIG. 2 is a flowchart illustrating a specific embodiment of the invention.

FIG. 2 is a flowchart illustrating a specific embodiment of the invention. According to this embodiment, a user of the system can request that the system present a sequence of maneuver instructions at any point during navigation on a generated route. The sequence can be all previously presented instructions up to the current vehicle position, or all remaining instructions from the current vehicle position to the final maneuver. Upon selection of a destination by the user (202), a route is generated from the current location of the vehicle to the destination (204) according to any of a wide variety of route generation techniques. According to a specific embodiment, the route is generated according to techniques described in commonly assigned, copending U.S. Application No. 08/784,204 for ROUTE GENERATION IN A VEHICLE NAVIGATION SYSTEM filed on Jan. 15,1997, a continuation-in-part of U.S. Pat. No. 5,712,788 for INCREMENTAL ROUTE CALCULATION issued on Jan. 27, 1998, the entirety of both being incorporated herein by reference for all purposes.

Once the route has been generated, the system determines a series of maneuvers the vehicle will need to execute to stay on the route (206). A maneuver instruction is generated for each of the maneuvers (208) for communication to the user during navigation. According to a specific embodiment, the generated instructions comprise audio representations which are audibly presented over a system speaker. The audio representations are constructed from a library of generic phrases such as, for example, "right turn", "one-half mile ahead", etc. A maneuver pointer or some other suitable mechanism for keeping track of the upcoming maneuver is then set to the first maneuver (210). If the vehicle is approaching the upcoming maneuver (212), i.e., is within some threshold distance of the maneuver, the associated maneuver instruction is presented to the user (214). That is, in the specific embodiment described above, the audio representation of the maneuver instruction is presented over the system speaker. According to various embodiments, the mileage to the upcoming maneuver is indicated in the instruction.

If at any time during navigation the user would like more than one of the instructions to be presented, actuation of a soft key in the user interface (216) causes the system to present a sequence of instructions. If the user has indicated that the remaining maneuver instructions are desired (218), the system presents all remaining maneuver instructions from the upcoming maneuver (i.e., the current pointer location) to the final maneuver on the route (220). If, on the other hand, the user has indicated that previous instructions are desired (218), the system presents all previous instructions from the first maneuver to the most recently presented maneuver (222).

The user may take advantage of this feature at any point after the maneuver instructions have been generated. That is, even before the vehicle embarks on the generated route, the user may request audio presentation of the remaining maneuver instructions, i.e., the entire set of maneuver instructions. For example, according to a specific embodiment of the invention, once they have been generated, all of the maneuver instructions for the generated route are visually presented in a graphical user interface (GUI) on the system's display screen. The GUI includes information for each maneuver such as, for example, a maneuver icon representing the maneuver, the road name at which the maneuver is to occur, and the distance from the previous maneuver. At this point, the user may request an audio presentation of the entire set of maneuver instructions by actuation of a soft key or by issuance of a verbal command.

If the last maneuver instruction for the route has not been presented (224), the maneuver pointer is advanced to the next maneuver (226) and the process repeats from 212. If the last maneuver has been presented the process ends.

Figure 3:
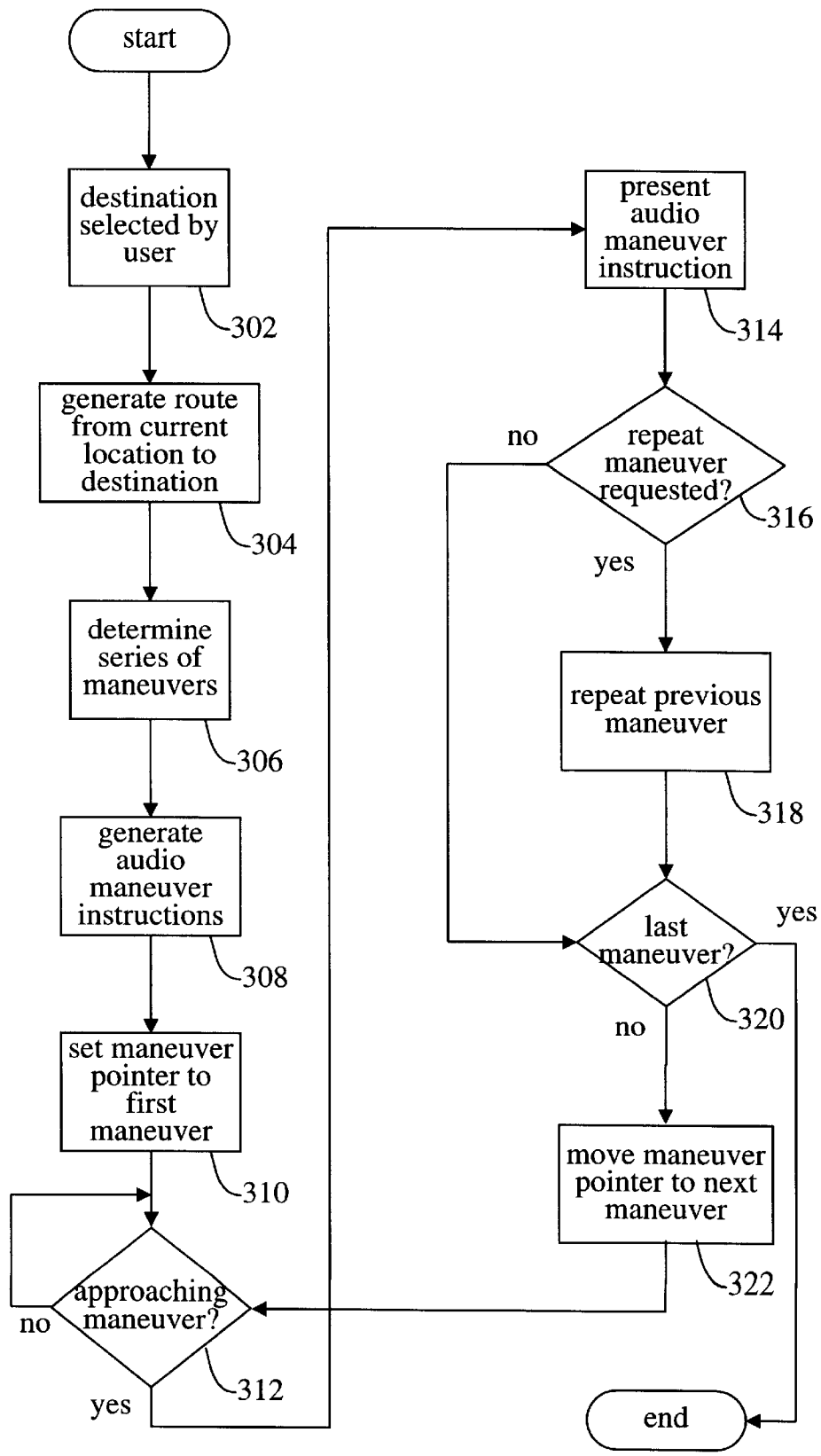
FIG. 3 is a flowchart illustrating another specific embodiment of the invention.

FIG. 3 is a flowchart illustrating another specific embodiment of the invention. According to this embodiment, the user can request that the system repeat the most recently presented maneuver instruction at any point during navigation. Upon selection of a destination by the user (302), a route is generated from the current location of the vehicle to the destination (304) according to any of a wide variety of route generation techniques as discussed above. Once the route has been generated, the system determines a series of maneuvers the vehicle will need to execute to stay on the route (306). A maneuver instruction is generated for each of the maneuvers (308) for communication to the user during navigation. A maneuver pointer or some other suitable mechanism for keeping track of the upcoming maneuver is then set to the first maneuver (310). If the vehicle is approaching the upcoming maneuver (312), i.e., is within some threshold distance of the maneuver, the associated maneuver instruction is presented to the user (314).

If at any time during navigation the user would like the most recent maneuver instruction to be repeated, actuation a soft key in the user interface (316) causes the system to repeat the most recently presented maneuver instruction (318). According to a specific embodiment, the mileage to the upcoming maneuver is adjusted to reflect a change in vehicle position. Thus, if the previous instruction had indicated that the maneuver was to be executed in 0.5 miles and the vehicle has traveled 0.2 miles since the instruction was presented, the repeated instruction indicates that the maneuver is to be executed in 0.3 miles. This embodiment employs 0.1 mile increments. Other embodiments may employ greater or lesser sensitivity. If the last maneuver instruction for the route has not been presented (320), the maneuver pointer is advanced to the next maneuver (322) and the process repeats from 312. If the last maneuver has been presented the process ends.

Figure 4:
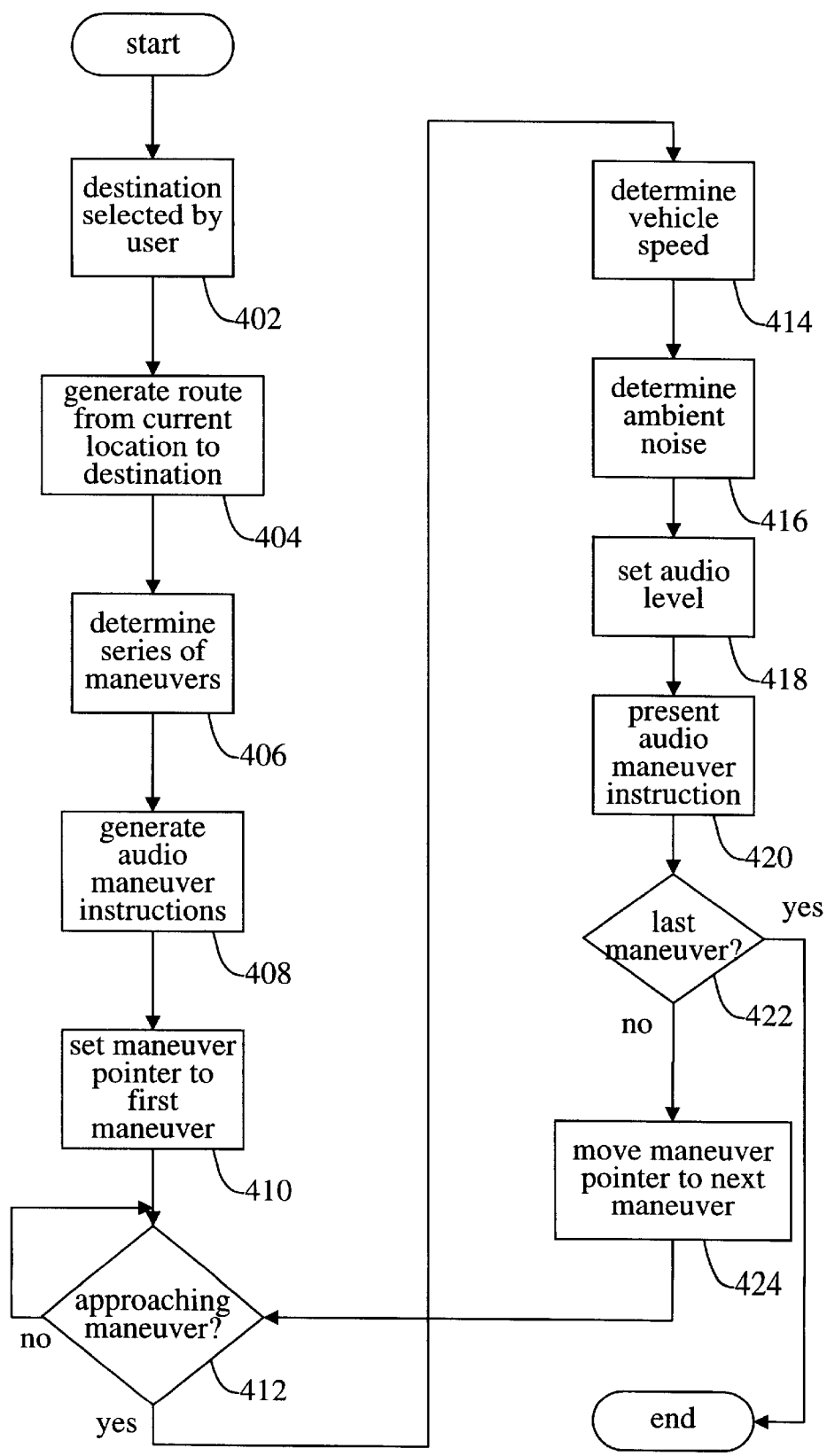
FIG. 4 is a flowchart illustrating yet another specific embodiment of the invention.

FIG. 4 is a flowchart illustrating yet another specific embodiment of the invention. According to this embodiment, the audio level for maneuver instructions is adjusted in response to the vehicle speed and/or the ambient noise level. Upon selection of a destination by the user (402), a route is generated from the current location of the vehicle to the destination (404) according to any of a wide variety of route generation techniques as discussed above. Once the route has been generated, the system determines a series of maneuvers the vehicle will need to execute to stay on the route (406). A maneuver instruction is generated for each of the maneuvers (408) for communication to the user during navigation. A maneuver pointer or some other suitable mechanism for keeping track of the upcoming maneuver is then set to the first maneuver (410). If the vehicle is approaching the upcoming maneuver (412), i.e., is within some threshold distance of the maneuver, the vehicle speed (414) and the ambient noise level (416) are determined and the audio level is set to an appropriate level for the background noise (418). Thus, for each maneuver instruction, the audio level either remains unchanged, is adjusted up, or adjusted down based on the vehicle speed and/or ambient noise level. Determination of the ambient noise may be accomplished using any of a variety of sound capture techniques and is well within the capabilities of one of skill in the art. The maneuver instruction associated with the upcoming maneuver is then presented (420). If the last maneuver instruction for the route has not been presented (422), the maneuver pointer is advanced to the next maneuver (424) and the process repeats from 412. If the last maneuver has been presented the process ends.

Figure 5:
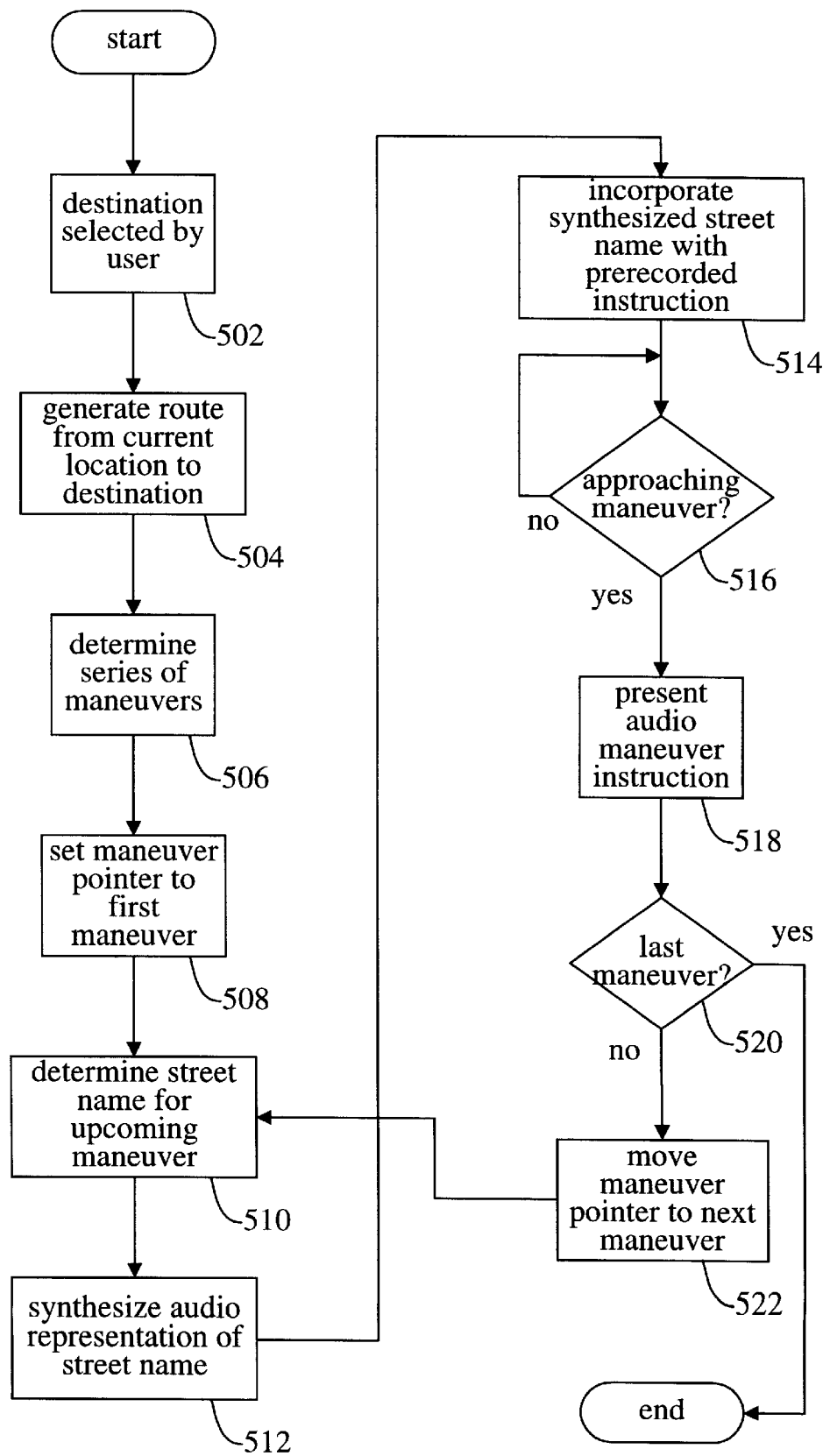
FIG. 5 is a flowchart illustrating still another specific embodiment of the invention.

FIG. 5 is a flowchart illustrating still another specific embodiment of the invention. According to this embodiment, enhanced audio maneuver instructions are generated and presented which include the name of the street at which the upcoming maneuver takes place. Upon selection of a destination by the user (502), a route is generated from the current location of the vehicle to the destination (504) according to any of a wide variety of route generation techniques as discussed above. Once the route has been generated, the system determines a series of maneuvers the vehicle will need to execute to stay on the route (506). A maneuver pointer or some other suitable mechanism for keeping track of the upcoming maneuver is then set to the first maneuver (508). The street name for the upcoming maneuver is then determined using information about the route and the current vehicle position 510). An audio representation of the street name is then synthesized using any of a variety of speech synthesis techniques (512). The synthesized street name is then incorporated with appropriate prerecorded generic instruction elements from the system's library into a maneuver instruction (514). According to some embodiments, these generic instruction elements include mileage indicators, e.g., "0.5 miles ahead". Once the vehicle has reached a threshold distance from the upcoming maneuver (516) the audio representation of the associated instruction is presented (518). If the last maneuver instruction for the route has not been presented (520), the maneuver pointer is advanced to the next maneuver (522) and the process repeats from 510. If the last maneuver has been presented the process ends.

While the invention has been particularly shown and described with reference to specific embodiments thereof, it will be understood by those skilled in the art that changes in the form and details of the disclosed embodiments may be made without departing from the spirit or scope of the invention. For example, the present invention has been discussed largely with reference to audio representations of maneuver instructions. It will be understood, however, that maneuver instructions may be presented in a graphical user interface without departing from the scope of the invention. Moreover, access to the features described herein may be implemented in a variety of ways. That is, the actuation of a soft key is merely one way in which a user may get the system to repeat a previous instruction or to present a series of maneuvers. Other methods could include the use of voice recognition technology enabling the user to make verbal requests. Therefore, the scope of the invention should be determined with reference to the appended claims.

What is claimed is:

1. A method for providing route guidance to a user of a vehicle navigation system and a vehicle, comprising:

in response to selection of a destination by the user, generating a route from a first position to the destination, the route comprising a plurality of maneuvers;

generating a plurality of maneuver instructions corresponding to the plurality of maneuvers;

presenting an audio representation of each of the maneuver instructions prior to execution of a corresponding one of the maneuvers;

in response to a first signal generated when the vehicle is at a first location on the route, presenting all remaining maneuver instructions corresponding to maneuvers on the route after the first location without regard to execution of the corresponding maneuvers.

2. The method of claim 1 further comprising generating the first signal in response to actuation of a switch by the user.

3. The method of claim 1 further comprising generating the first signal in response to a voice command from the user.

4. The method of claim 1 further comprising sequentially presenting all previous maneuver instructions corresponding to maneuvers on the route before the first location in response to generation of a second signal at the first location.

5. The method of claim 4 further comprising generating the second signal in response to actuation of a switch by the user.

6. The method of claim 4 further comprising generating the second signal in response to a voice command from the user.

7. A vehicle navigation system for use in a vehicle, comprising:
   a plurality of sensors for generating data for use by the vehicle navigation system for navigation;
   a user interface for communicating with a user of the vehicle navigation system;
   guidance signal generation circuitry for generating a first signal; and
   a central processing unit which is operable to:
      generate a route from a first position to a destination in response to selection of the destination by the user, the route comprising a plurality of maneuvers;
      generate a plurality of maneuver instructions corresponding to the plurality of maneuvers;
      present an audio representation of each of the maneuver instructions prior to execution of a corresponding one of the maneuvers by the vehicle; and
      present all remaining maneuver instructions corresponding to maneuvers on the route after the first location in response to generation of the first signal when the vehicle is at a first location on the route without regard to execution of the corresponding maneuvers.

8. A computer program product for providing route guidance to a user of a vehicle navigation system and a vehicle, comprising:
   at least one computer-readable medium; and
   a computer program mechanism embedded in the at least one computer-readable medium for causing a computer to perform the steps of:
      in response to selection of a destination by the user, generating a route from a first position to the destination, the route comprising a plurality of maneuvers;
      generating a plurality of maneuver instructions corresponding to the plurality of maneuvers;
      presenting an audio representation of each of the maneuver instructions prior to execution of a corresponding one of the maneuvers by the vehicle;
      in response to a signal generated when the vehicle is at a first location on the route, presenting all remaining maneuver instructions corresponding to maneuvers on the route after the first location without regard to execution of the corresponding maneuvers.

9. A method for providing route guidance to a user of a vehicle navigation system, comprising:
   in response to selection of a destination by the user, generating a route from a first position to the destination, the route comprising a plurality of maneuvers;
   generating a plurality of maneuver instructions corresponding to the plurality of maneuvers;
   presenting an audio representation of each of the maneuver instructions prior to execution of a corresponding one of the maneuvers, each of the maneuver instructions having an audio level associated therewith;
   determining an ambient noise level;
   generating a first signal in response to determination of the ambient noise level; and
   in response to the first signal, adjusting the audio level associated with at least one instruction.

10. The method of claim 9 wherein adjusting the audio level comprises increasing the audio level associated with the at least one instruction.

11. The method of claim 9 wherein adjusting the audio level comprises decreasing the audio level associated with the at least one instruction.

12. A vehicle navigation system for use in a vehicle, comprising:
   a plurality of sensors for generating data for use by the vehicle navigation system for navigation;
   a user interface for communicating with a user of the vehicle navigation system;
   guidance signal generation circuitry for generating a first signal; and
   a central processing unit which is operable to:
      generate a route from a first position to a destination in response to selection of the destination by the user, the route comprising a plurality of maneuvers;
      generate a plurality of maneuver instructions corresponding to the plurality of maneuvers;
      present an audio representation of each of the maneuver instructions prior to execution of a corresponding one of the maneuvers, each of the maneuver instructions having an audio level associated therewith;
      determine an ambient noise level;
      generate a first signal in response to determination of the ambient noise level; and
      adjust the audio level associated with at least one instruction in response to the first signal.

13. A computer program product for providing route guidance to a user of a vehicle navigation system, comprising:
   at least one computer-readable medium; and
   a computer program mechanism embedded in the at least one computer-readable medium for causing a computer to perform the steps of:
      in response to selection of a destination by the user, generating a route from a first position to the destination, the route comprising a plurality of maneuvers;
      generating a plurality of maneuver instructions corresponding to the plurality of maneuvers;
      presenting an audio representation of each of the maneuver instructions prior to execution of a corresponding one of the maneuvers, each of the maneuver instructions having an audio level associated therewith;
      determining an ambient noise level;
      generating a first signal in response to determination of the ambient noise level; and in response to the first signal, adjusting the audio level associated with at least one instruction.

14. A method for providing route guidance to a user of a vehicle navigation system, comprising:

in response to selection of a destination by the user, generating a route from a first position to the destination, the route comprising a plurality of maneuvers;

generating a plurality of maneuver instructions corresponding to the plurality of maneuvers; and presenting an audio representation of each of the maneuver instructions prior to execution of a corresponding one of the maneuvers;

wherein selected ones of the maneuver instructions are associated with a street name comprising alphanumeric characters, the audio representation of the selected maneuver instructions including the associated street name and wherein the audio representation of the street name is constructed using voice synthesis techniques.

15. A vehicle navigation system for use in a vehicle, comprising:

a plurality of sensors for generating data for use by the vehicle navigation system for navigation;

a user interface for communicating with a user of the vehicle navigation system; and a central processing unit which is operable to:

generate a route from a first position to a destination in response to selection of the destination by the user, the route comprising a plurality of maneuvers;

generate a plurality of maneuver instructions corresponding to the plurality of maneuvers; and present an audio representation of each of the maneuver instructions prior to execution of a corresponding one of the maneuvers, wherein selected ones of the maneuver instructions are associated with a street name comprising alphanumeric characters, the audio representation of the selected maneuver instructions including the associated street name and wherein the audio representation of the street name is constructed using voice synthesis techniques.

16. A computer program product for providing route guidance to a user of a vehicle navigation system, comprising:

at least one computer-readable medium; and a computer program mechanism embedded in the at least one computer-readable medium for causing a computer to perform the steps of:

in response to selection of a destination by the user, generating a route from a first position to the destination, the route comprising a plurality of maneuvers;

generating a plurality of maneuver instructions corresponding to the plurality of maneuvers; and presenting an audio representation of each of the maneuver instructions prior to execution of a corresponding one of the maneuvers;

wherein selected ones of the maneuver instructions are associated with a street name comprising alphanumeric characters, the audio representation of the selected maneuver instructions including the associated street name and wherein the audio representation of the street name is constructed using voice synthesis techniques.

17. A method for providing route guidance to a user of a vehicle navigation system, comprising:

in response to selection of a destination by the user, generating a route from a first position to the destination, the route comprising a plurality of maneuvers;

generating a plurality of maneuver instructions corresponding to the plurality of maneuvers;

presenting an audio representation of each of the maneuver instructions prior to execution of a corresponding one of the maneuvers, each of the maneuver instructions having an audio level associated therewith;

determining a vehicle speed;

generating a first signal in response to determination of the vehicle speed; and in response to the first signal, adjusting the audio level associated with at least one instruction.

* * * * *